United States Patent [19]
Judkins et al.

[11] Patent Number: 5,757,540
[45] Date of Patent: May 26, 1998

[54] LONG-PERIOD FIBER GRATING DEVICES PACKAGED FOR TEMPERATURE STABILITY

[75] Inventors: Justin Boyd Judkins, Berkeley Heights; Paul Joseph Lemaire, Madison; Ashish Madhukar Vengsarkar, Berkeley Heights, all of N.J.

[73] Assignee: Lucent Technologies Inc., Murray Hill, N.J.

[21] Appl. No.: 716,658

[22] Filed: Sep. 6, 1996

[51] Int. Cl.⁶ .................................. G02B 6/34; H01S 3/00
[52] U.S. Cl. .................................. 359/341; 385/37
[58] Field of Search .................. 359/341, 566, 359/568, 569, 577, 578; 356/345; 385/123, 37

[56] References Cited

U.S. PATENT DOCUMENTS

| | | |
|---|---|---|
| 5,042,898 | 8/1991 | Morey et al. .................. 385/37 |
| 5,430,817 | 7/1995 | Vengsarkar .................. 385/37 |
| 5,613,023 | 3/1997 | Guillon et al. .................. 385/37 |
| 5,647,039 | 7/1997 | Judkins et al. .................. 385/37 |

*Primary Examiner*—Mark Hellner

[57] ABSTRACT

The present applicants have discovered that one can fabricate a long-period grating wherein the grating peak wavelength $\lambda_p$ will be shifted in different directions when the grating is subject to temperature and tensile strain, respectively. Accordingly, a long-period grating can be designed and packaged such that a temperature-induced shift in $\lambda_p$ is compensated by a corresponding strain-induced shift arising from a single packaging material. Thus, by proper design of the grating and choice of the packaging material expansion coefficient, a temperature stable grating having temperature sensitivity of less than 4 nm per 100° C. can comprise a grating fiber encased in or attached to a package comprising a single material such as glass, polymer or metal. Such designs permit the use of long-period grating devices without temperature control.

13 Claims, 6 Drawing Sheets

LONG-PERIOD FIBER GRATING DEVICES PACKAGED FOR TEMPERATURE STABILITY

FIELD OF THE INVENTION

This invention relates to long-period grating devices and, in particular, to such devices packaged for enhanced stability to variations in temperatures.

BACKGROUND OF THE INVENTION

Long-period fiber grating devices provide wavelength dependent loss. A long-period grating couples optical power between two copropagating modes with very low back reflections. A long-period grating typically comprises a length of optical fiber wherein a plurality of refractive index perturbations are spaced along the fiber by a periodic distance $\Lambda$ which is large compared to the wavelength $\lambda$ of the transmitted light. In contrast with conventional Bragg gratings, long-period gratings utilize a periodic spacing $\Lambda$ which is typically at least 10 times larger than the transmitted wavelength, i.e. $\Lambda \geq 10\lambda$. Typically $\theta$ is in the range 15–1500 micrometers, and the width w of a perturbation is in the range $\frac{1}{5}\Lambda$ to $\frac{4}{5}\Lambda$. In some applications, such as chirped gratings, $\Lambda$ can vary along the length of the grating.

Long-period fiber grating devices selectively remove light at specific wavelengths by mode conversion. In contrast with conventional Bragg gratings which reflect light, long-period gratings remove light without reflection by converting it from a guided mode to a non-guided mode. The spacing $\Lambda$ of the perturbations is chosen to shift transmitted light in the region of a selected peak wavelength $\lambda_p$ from a guided mode into a nonguided mode, thereby reducing in intensity a band of light centered about $\lambda_p$. Alternatively, $\Lambda$ can be chosen to shift light from one guided mode to a second guided mode (typically a higher order mode) which is subsequently stripped to provide a wavelength-dependent loss.

Long period grating devices are thus useful as filtering and spectral shaping devices in a variety of optical communications applications. Key applications include spectral shaping for high-power broadband light sources (C. W. Hodgson et al., 9 *Optical Society of America Technical Digest Series*, Paper TuG3 (1996)), gain equalization for optical amplifiers (A. M. Vengsarkar et al. 21 *Optics Letters* 336, (1996), band rejection in cascaded high-power Raman lasers (S. G. Grubb et al, *Laser Focus World*, p. 127 (February 1996)), and filtering amplified spontaneous emission in erbium doped amplifiers (A. M. Vengsarkar et al., 14 *J. Light-wave Technol.* 58 (1996)).

While long period gratings work exceptionally well in these applications, they exhibit high temperature sensitivity. The peak wavelength $\lambda_p$ shifts by 5–15 nm per 100° C. change in temperature. This sensitivity is about five times higher than for short-period fiber Bragg gratings. For some applications where ambient temperatures can fluctuate between 5° and 45° C., such variation is not acceptable.

The conventional temperature compensating packages used to reduce the temperature sensitivity of Bragg gratings do not solve the problem of long-period grating temperature sensitivity. One conventional packaging approach is to place the fiber in a temperature-controlled package. This approach would work, but the cost, reliability and power demands of temperature control are unacceptable in many applications. A second approach proposed for Bragg gratings is to package the fiber under tension with ends attached to two different materials having different coefficients of thermal expansion. Variation in temperature will change the strain on the fiber by amount sufficient to compensate for the temperature sensitivity of the fiber. See William W. Morey et al., U.S. Pat. No. 5,042,898 issued Aug. 27, 1991 and G. W. Yoffe et al., "Passive Temperature-Compensating Package For Optical Fiber Gratings", 34 *Applied Optics* 6859 (Oct. 20, 1995). With this approach it is assumed that both the strain and temperature coefficients have the same sign, i.e. that wavelength increases with both increasing temperature and increasing tensile strain.

In a copending application of DiGiovanni and two of the present applicants, Ser. No. 08/539,473 filed Oct. 4, 1995 and entitled "Temperature Insensitive Long-Period Fiber Grating Devices" it is disclosed that the temperature sensitivity of long-period grating devices is due to differential variation with temperature of the effective indices of the core and cladding modes and that the cladding profile and fiber composition can be redesigned to substantially reduce this differential variation, thereby reducing the temperature sensitivity. The co-pending application is incorporated herein by reference. This approach provides an elegant solution to temperature sensitivity for important applications. However it places the burden of stabilization on accurate preform and fiber manufacture. It further eliminates the possibility of using standard telecommunication fibers as the grating host, raises the necessity of splicing and introduces added insertion loss. Accordingly there remains a need for additional methods for stabilizing long-period gratings.

SUMMARY OF THE INVENTION

The present applicants have discovered that one can fabricate a long-period grating wherein the grating peak wavelength $\lambda_p$ will be shifted in different directions when the grating is subject to temperature and tensile strain, respectively. Accordingly, a long-period grating can be designed and packaged such that a temperature-induced shift in $\lambda_p$ is compensated by a corresponding strain-induced shift arising from a single packaging material. Thus, by proper design of the grating and choice of the packaging material expansion coefficient, a temperature stable grating having temperature sensitivity of less than 4 nm per 100° C. can comprise a grating fiber encased in or attached to a package comprising a single material such as glass, polymer or metal. Such designs permit the use of long-period grating devices without temperature control.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

3

Figure 1:
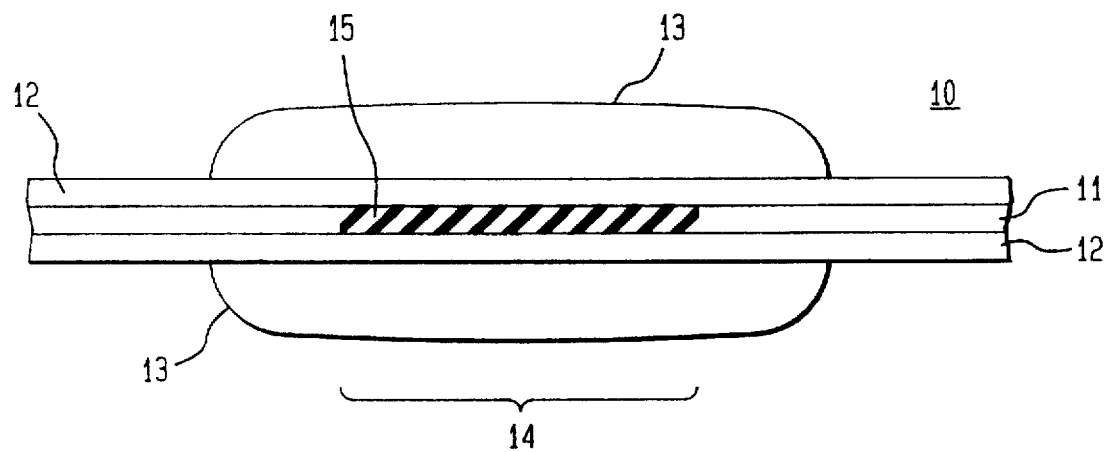
FIG. 1 is a schematic view of a packaged long-period grating in accordance with one embodiment of the invention.
Figure 8:
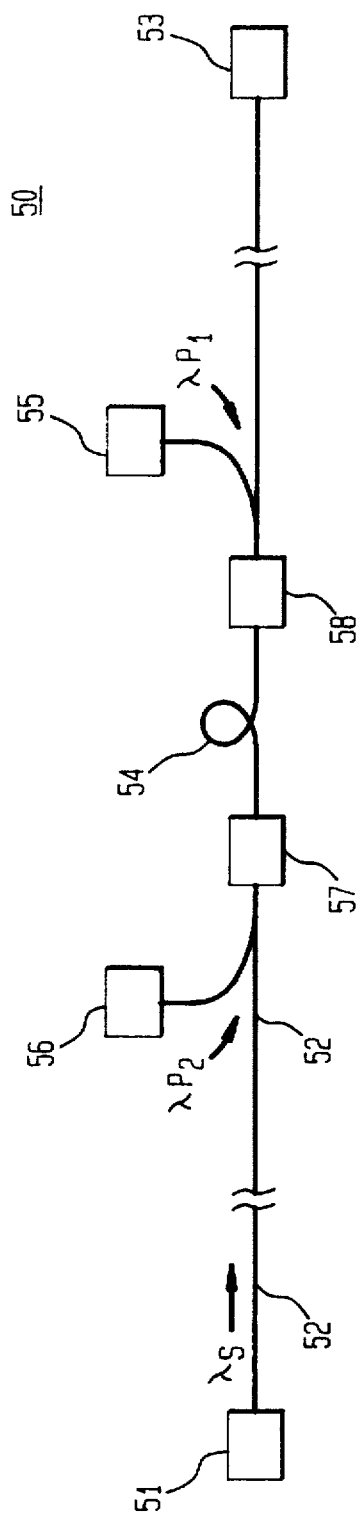
Figure 9:
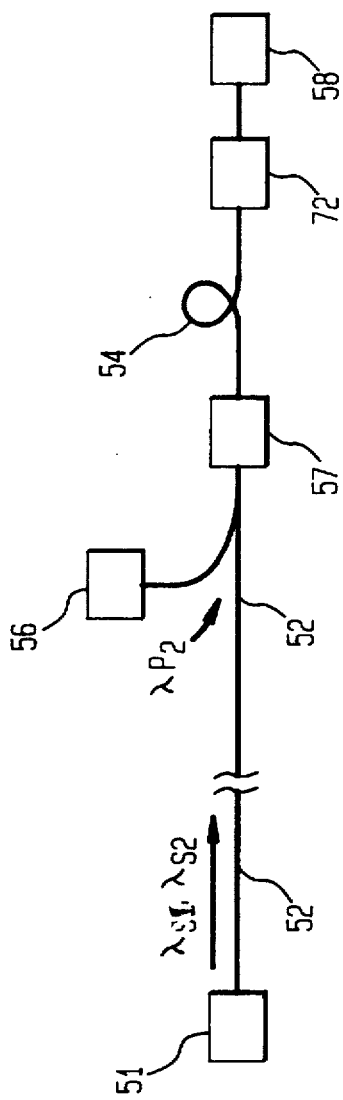

FIG. 8 shows an optical transmission system using a long-period grating device according to FIG. 1 to remove unused pump energy;

FIG. 9 shows an optical transmission system using a long-period grating device according to FIG. 1 to shape the gain of a rare-earth doped optical amplifier.

It is to be understood that these drawings are for purposes of illustrating the concepts of the invention and are not to scale.

DETAILED DESCRIPTION

Referring to the drawings, FIG. 1 is a schematic cross section of a long-period grating device packaged for enhanced temperature stability. The device comprises a length of optical fiber 10 for transmitting light in a guided mode having a core 11 surrounded by a cladding 12 having an index of refraction lower than the index of the core 11. The grating device is designed so that the shift of the peak wavelength with temperature ($d\lambda_p/dT$) is opposite in sign from the shift with tensile strain ($d\lambda_p/d\epsilon$). The fiber is packaged within a single material package 13 such as a capillary tube of glass or polymer. The package is adherent to the fiber and substantially thicker than the fiber so that expansion or contraction of the package transmits to the fiber a tensile strain which reduces the shift of the peak wavelength with temperature. A preferred materials system is germanium doped silica for the core 11, silica for the cladding 12 and fluorocarbon polymer for the packaging.

Figure 2:
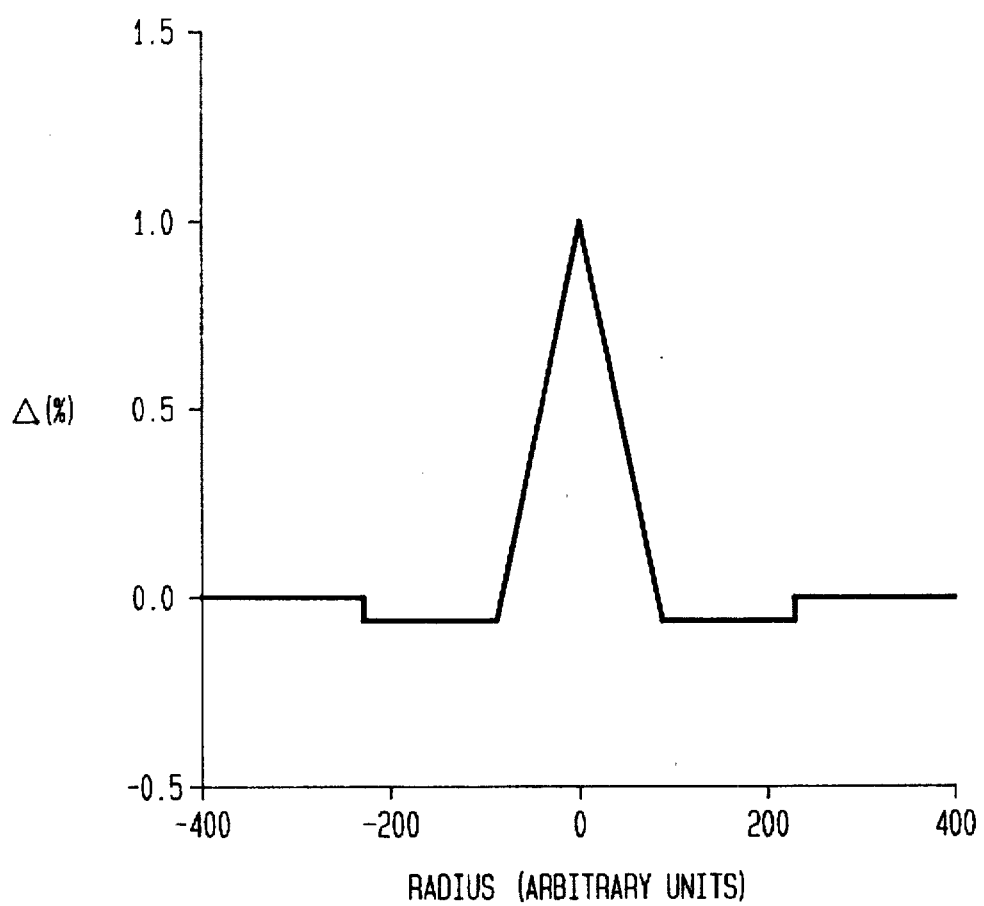
FIG. 2 is a graphical illustration of the index profile of an exemplary optical fiber suitable for making a long-period device of the type shown in FIG. 1.

FIG. 2 is a refractive index profile for a preferred fiber for practicing the invention. The core is germanium doped silicon, the inner cladding is silica doped with fluorine or phosphorous, and the outer cladding can be pure silica. As is well known in the art, the dimensions of the fiber depend on the desired peak wavelength. For $\lambda_p$ at 1550 nm, fifty arbitrary units are approximately four microns.

The core 11 includes one or more long period gratings 14, each comprising a plurality of index perturbations 15 of width w spaced apart by a periodic (or approximately periodic) distance $\Lambda$ where, typically, 15 μm $\leq \Lambda <$ 1500 μm. Advantageously, $\frac{1}{5}\Lambda \leq w \leq \frac{4}{5}\Lambda$ and preferably $w = \frac{1}{2}\Lambda$. The perturbations are formed within the glass core of the fiber and preferably form an angle $\theta$ ($2° \leq \theta \leq 90°$) with the longitudinal axis of the fiber. The fiber is designed to transmit broadband light of wavelength centered about $\lambda$ in a guided mode.

The spacing $\Lambda$ of the perturbations is chosen to shift transmitted light in the region of a selected wavelength $\lambda_p$ from the guided mode into a non-guided mode, thereby reducing in intensity a band of light centered about $\lambda_p$. A non-guided mode is a mode which is not confined to the core but rather is defined by the entire waveguide structure. It is typically a cladding mode, a radiation mode or, in the case of multilayer profiles, a ring mode.

Figure 3:
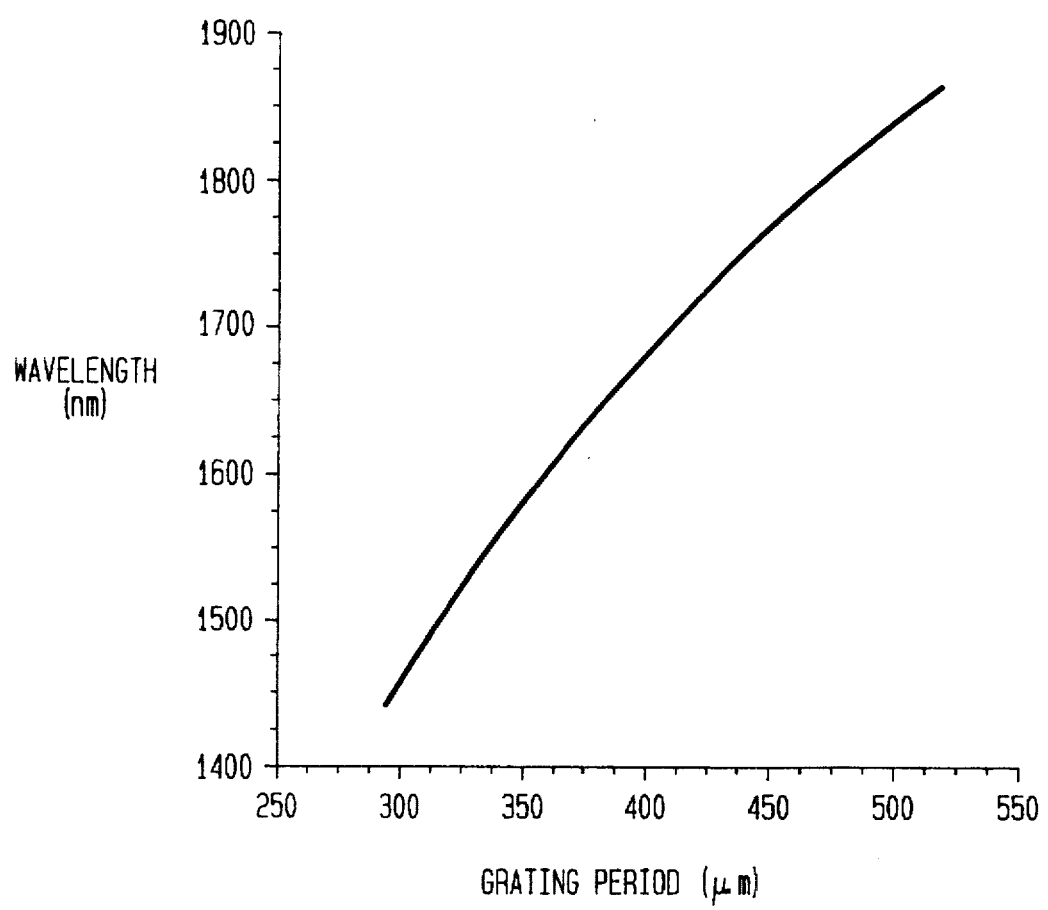
FIG. 3 is a graphical plot of center wavelength $\lambda_p$ versus period $\Lambda$ useful in making the device of FIG. 1.

FIG. 3 is a graph illustrating for the fiber of FIG. 2 the periodic spacing $\Lambda$ for removing light centered about wavelength $\lambda_p$. Thus, as shown in FIG. 3, to make a device for removing light centered around $\lambda_p = 1540$ nm, one chooses a spacing of $\Lambda = 330$ μm.

Analytically, the phase matching condition between the guided mode and the forward-propagating cladding modes is given by $\beta_{01} - \beta_{cl}^{(m)} = 2\pi n/\Lambda$, where $\Lambda$ is the grating periodicity required to couple the fundamental mode to the $m^{th}$ cladding mode. By recasting the phase matching condition, one can express the peak wavelength of mode coupling as $\lambda_p = \Lambda (n_{01} - n^{(m)}) = \Lambda \Delta n$, where no, and $n^{(m)}$ are the effective indices of the fundamental mode and the $HE_{1m}$ cladding

4 mode. A similar relation can be obtained for coupling light between two co-propagating guided modes.

The long-period grating 14 can be formed by selectively exposing the core to beams of intense light of width w at locations separated by a distance $\Lambda$. Preferably, as a preliminary step, the fiber is loaded with molecular hydrogen or deuterium to enhance the photosensitivity of the core. The preferred exposure source is UV radiation from an excimer laser. Proper spacing can be effected by exposing through a slit of width w and then moving the fiber to the next exposure site. Alternatively, the fiber can be exposed to a wide beam from the laser through an amplitude mask providing a plurality of transparent slits at spacing $\Lambda$ and slit width w. Preferably the exposure dosage for each slit is on the order of 1000 pulses of >100 mJ/cm² fluence/pulse, and the number of perturbations is in the range 10–100.

In order to enhance temperature stability, the fiber grating is fabricated so that an increase in temperature T will increase the peak wavelength (i.e. $d\lambda_p/dT > 0$) whereas an increase in the tensile strain $\epsilon$ will decrease the peak wavelength ($d\lambda_p/d\epsilon < 0$). Alternatively, the grating can be designed so that $d\lambda_p/dT < 0$ and $d\lambda_p/d\epsilon > 0$. In either case, the response of the peak wavelength to temperature is opposite in polarity (direction of shift) to its response to strain, and the grating can be placed in a package made of a single material with thermal expansion properties which will balance the opposing strain and temperature effects.

Figure 4:
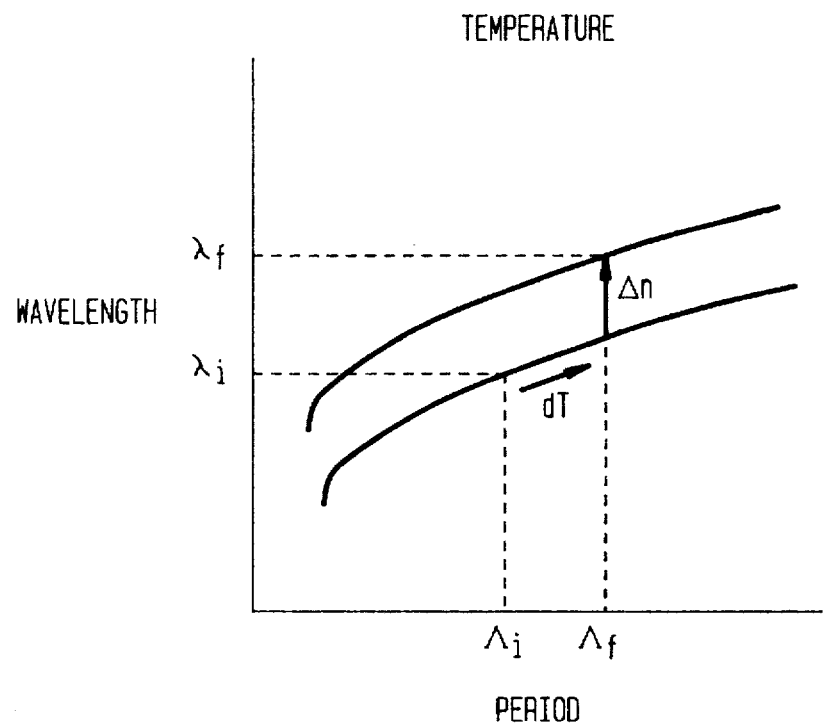
FIGS. 4, 5 and 6 are graphical illustrations useful in designing a device where $\lambda_p$ shifts in opposite directions with increases in temperature T and tensile strain $\epsilon$, respectively.

This design can be better understood by reference to FIG. 4 which schematically illustrates a typical $\lambda_p$ versus $\Lambda$ curve. As the temperature increases, the grating periodicity $\Lambda$ increases. This is indicated by the arrow labeled dT. Further the entire curve shifts up due to a change in the differential effective index $\Delta n$. A temperature rise thus leads to an increase in the peak wavelength from $\lambda_i$ to $\lambda_f$.

Figure 5:
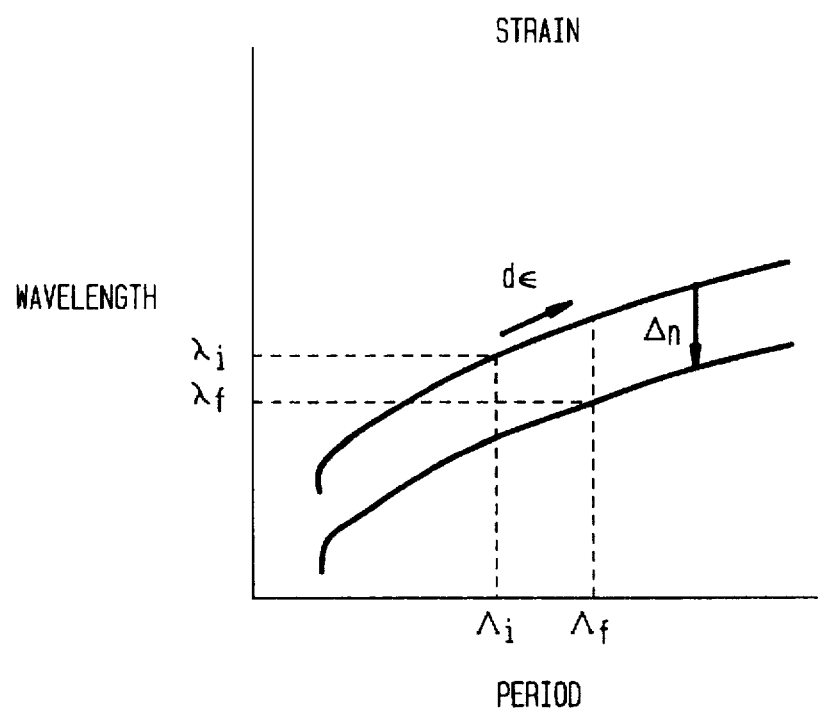

FIG. 5 schematically illustrates a similar plot showing the effect of tensile strain $\epsilon$. As the grating is strained, the period $\Lambda$ increases leading to an apparent increase in the peak wavelength. However, with design in accordance with the invention, the differential index $\Delta n$ decreases with strain, thus shifting the entire curve down. Since the effect of downshifting due to $\Delta n$ is much larger than the apparent increase in $\lambda_p$ due to $\Lambda$, the peak wavelength $\lambda_p$ decreases as the strain increases. This is depicted by the shift from $\lambda_i$ to $\lambda_f$ where $\lambda_i < \lambda_f$.

Figure 6:
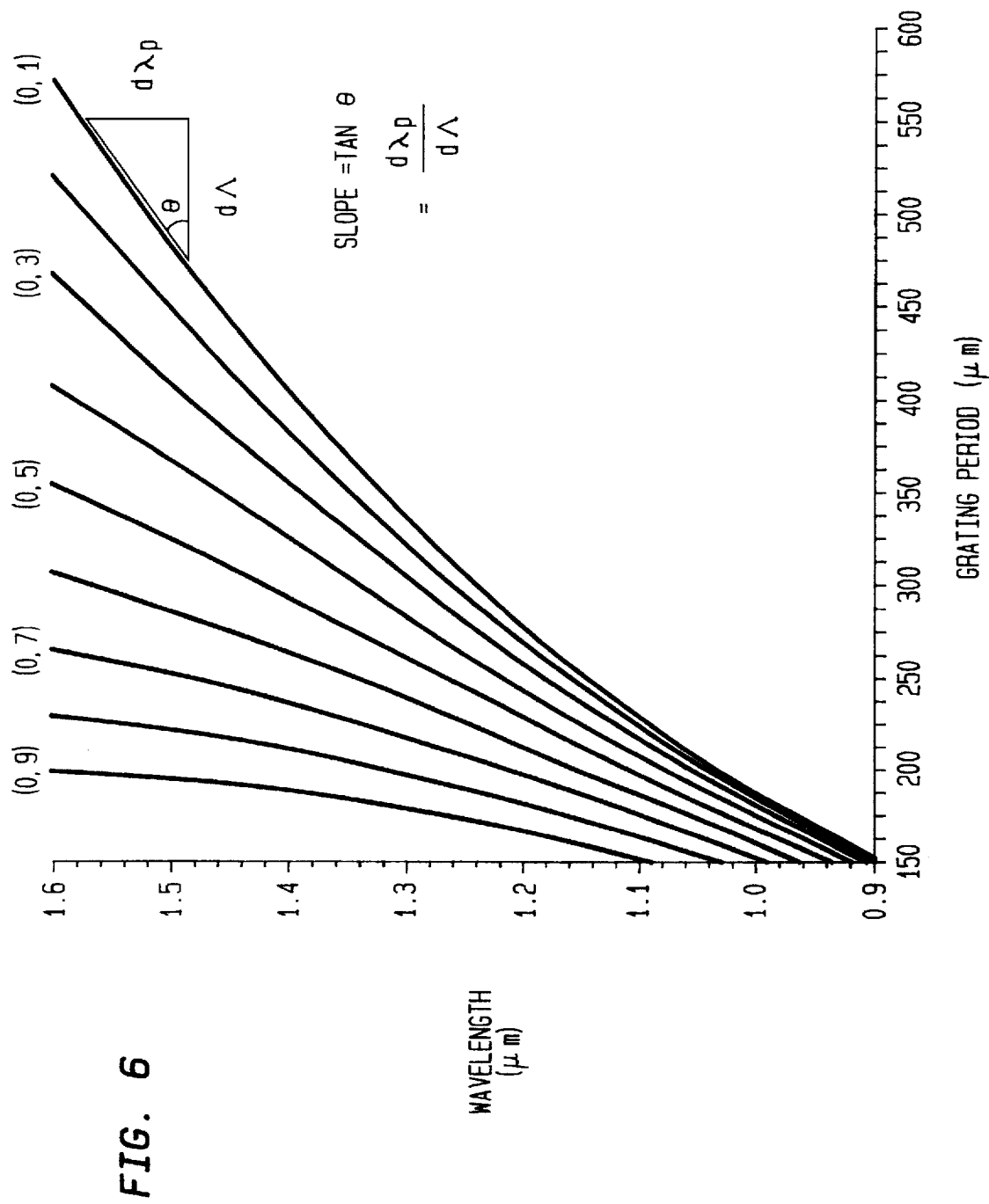

Design of a long period fiber grating device to exhibit the desired condition that $d\lambda_p/dT$ differs in sign from $d\lambda_p/d\epsilon$ requires consideration of both the characteristics of the fiber and the period of the grating. The governing equation for the peak wavelength, $\lambda_p$, at which light couples from a guided (typically fundamental) mode to a non-guided mode is:

$$\lambda_p = (n_{01} - n_{ng})\Lambda,$$

where $n_{01}$ is the effective index of the guided mode, $n_{ng}$ is the effective index of the non-guided mode and $\Lambda$ is the periodicity of the grating. Typical gratings are characterized by a calibration plot of the peak wavelength as a function of the periodicity of the grating. FIG. 6 illustrates such plots for nine different cladding modes for a fiber whose refractive index profile is plotted in FIG. 2. These plots are helpful in determining the choice of periodicity for effecting a modal coupling at a particular wavelength with a given slope.

As the grating is subjected to tensile strain, several changes take place. First, the grating periodicity tends to increase purely due to a stretching effect. Secondly, the Poisson effect leads to a reduction in the lateral dimensions (diameter) of the waveguide (fiber). Third, the refractive index of the waveguide can change due to the photoelastic effect. All these effects directly impact the effective indices of the two modes. In general, the effective indices of the cladding modes are affected less by the straining effect than the effective indices of the guided modes.

We now consider the case where an increase in temperature results in an increase in peak wavelength ($d\lambda_p/dT>0$) and describe the design rules under which we get a grating with $d\lambda_p/d\epsilon<0$.

1. First, the effect of the increased $\Lambda$ on the peak wavelength should be minimal. This is obtainable for fibers whose characteristic curve is flat, i.e. the slope of the $\lambda_p$ versus $\Lambda$ curve (FIG. 6) is small. As a typical example, for a dispersion-shifted-fiber with a triangular refractive index profile, the slope of the curve (which couples the fundamental guided mode to the second symmetric cladding mode) is 0.002. This is low compared to a conventional step-index fiber whose characteristic curve can have slopes twenty times higher. (As an aside, it should be noted that even the triangular-profile fiber of FIG. 2 has on its calibration curve sections where the slopes are high). The design skill lies in choosing the proper combination of the grating periodicity and the cladding mode that will result in a grating at the desired wavelength from a low-slope region of the calibration curve.

2. Secondly, the effective index of the guided mode should be strongly dependent on the material properties of the fiber. This allows the term $n_0$, to change (in this case, decrease) dramatically with the changing strain, thus offsetting any positive change introduced by the $\Lambda$ term. The dependence of $n_{01}$ on strain (and hence on the material properties of the glass) is obtained from standard tables that describe bulk properties of the glass material and the waveguide equation. Armed with the bulk properties of the glass, the change in $n_{01}$ can be obtained by considering the two key effects described earlier, namely, the Poisson effect and the photoelastic effect. While all the above design criteria use highly-developed modeling tools, the inventors have found that a weakly guiding mode in a germanosilicate fiber can provide a strong negative dependence of the $n_{01}$ strain.

When the device is designed so that $d\lambda_p/dT$ and $d\lambda_p/d\epsilon$ are of opposite sign, an appropriate single-material package can be chosen to enhance thermal stability. Assume that $d\lambda_p/dT=|\gamma|$ expressed in nm/C and $d\lambda_p/d\epsilon=-|\alpha|$. The package material is then chosen with a thermal expansion coefficient, $\beta_{package}$, such that the grating bonded to the package will be stretched as the temperature increases. The exact value of the thermal expansion coefficient is ideally chosen such that the shift in $\lambda_p$ induced by the extension of the grating will offset the shift due to the heating. The equation governing the optimal choice of packaging material is:

$$\beta_{package} = \frac{-\gamma}{\alpha} + \beta_{fiber}$$

where $\beta_{fiber}$ is the thermal expansion coefficient of the fiber.

It should be noted that the above analysis is somewhat simplified and approximate. A thorough electromagnetic analysis would require a detailed numerical calculation of the electromagnetic fields propagating in the fiber as outlined in the above mentioned DiGiovanni copending application.

The invention can now be better understood by reference to the following specific example.

EXAMPLE

Figure 7:
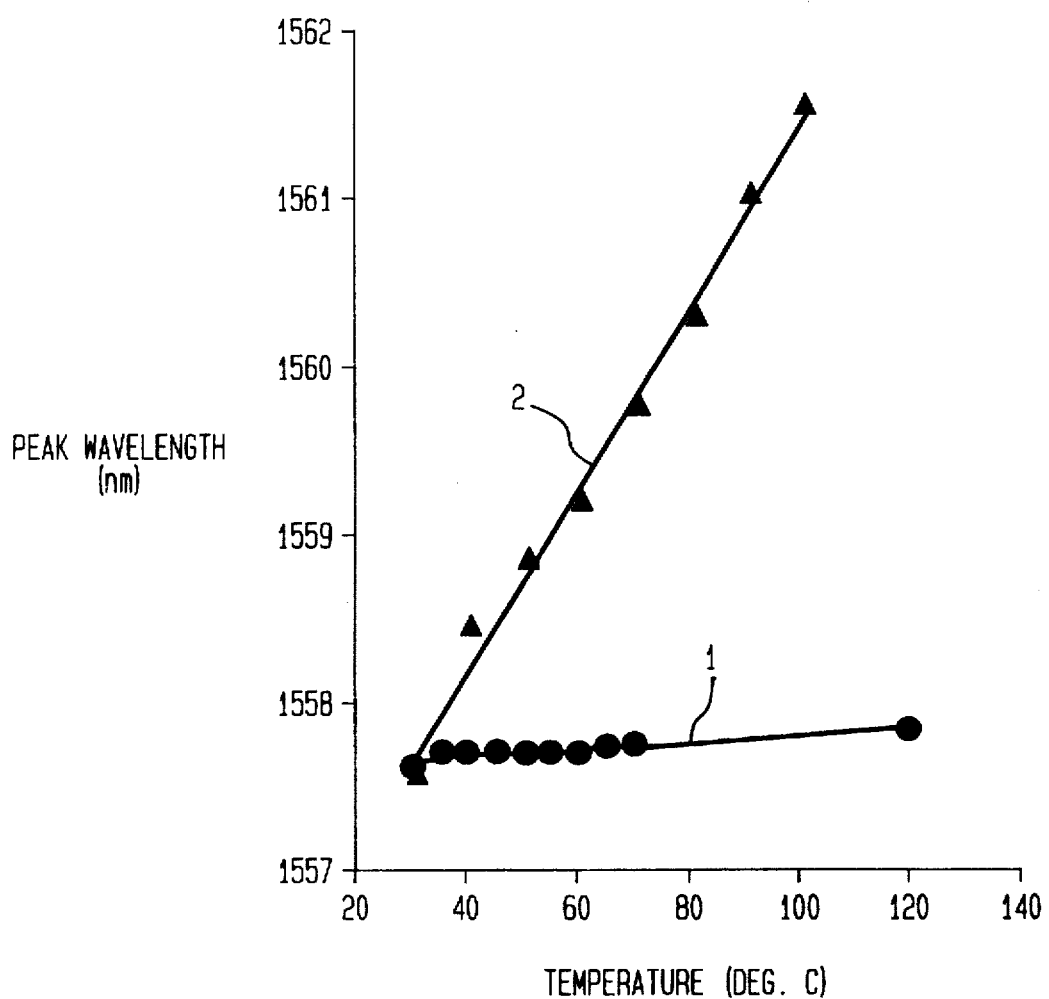
FIG. 7 is a graphical plot showing the peak wavelength as a function of temperature for an exemplary grating device with and without packaging

A long-period grating of periodicity $\Lambda=388$ μm was written on a fiber with refractive-index profile depicted in FIG. 2. The temperature dependence of $\lambda_p$ was measured as $\lambda=0.073$ nm/° C. The strain dependence was $\alpha=-0.7$ nm/mE. The grating was packaged in ·Teflon® (FEP polymer) having a thermal expansion coefficient of about $10.4\times10^{-5}$/C. FIG. 7 shows the temperature dependence of the peak wavelength with packaging (curve 1) and without packaging (curve 2). The improvement is dramatic. Packaging reduces the slope of $\lambda_p$ versus T from 5 nm/C to 0.003 nm/C. Alternatively the grating can be packaged by mechanically coupling it to a planar substrate of FEP polymer, polyester or polyethylene. For example, the grating would be attached to the substrate by appropriate metal hardware.

Preferred uses of the invention are filtering and spectral shaping in optical fiber amplifier communications subsystems and in detector/repeater components of optical fiber communications systems.

FIG. 8 illustrates an optical transmission system 50 using the temperature insensitive long-period spectral shaping device of FIG. 1 to remove unused pump energy. Specifically, the system 50 comprises a transmitter source 51 of optical signals such as a digitally modulated 1.55 μm signal, an optical signal path comprising a length of optical fiber 52 for transmitting the signal, and a receiver 53 for receiving and demodulating the signal. An optical amplifier such as an erbium-doped fiber amplifier 54 is disposed in the optical signal path for amplifying the transmitted signal. The amplifier is pumped by pump sources 55, 56 of pump wavelengths $\lambda_{p1}$ and $\lambda_{p2}$. Unused pump energy of each pump wavelength will pass through amplifier 54. The energy is advantageously removed from the system so that it will not deteriorate the performance of the pump sources 55, 56 and transmission and receiving equipment 51, 53. To remove unused pump energy, a long period spectral shaping device 57 is disposed in the path of the energy from pump 55 after it has passed through amplifier 54. Specifically, in the dual-pumped laser of FIG. 6, device 57 has its spacing $\Lambda$ chosen to remove energy of wavelength $\lambda_{p1}$. A second long period grating 58 has its spacing chosen to remove energy of wavelength $\lambda_{p2}$. In a typical application, $\lambda_s$ is 1.55 μm, $\lambda_{p1}$ is 0.978 μm and $\lambda_{p2}$ is 0.98 μm. Thus, for example, device 57 could comprise a hydrogen-loaded germanosilicate fiber with core index and diameter chosen such that it allows the propagation of only the fundamental mode at, $\lambda \geq 0.97$ μm. For this application the perturbations should be exposed by a dosage $\geq 100$ mJ/cm$^2$ and there should be at least 20 perturbations in each grating. The preferred packaging material is an FEP polymer, polyester or polyethylene having thermal expansion of about $10.4\times10^{-5}$/°C.

Another preferred use of the device of FIG. 1 is to reduce spectral dependence in the gain output of a rare-earth doped optical fiber amplifier. The characteristic gain spectrum of an erbium-doped optical fiber amplifier, for example, has a pair of gain peaks at about 1.53 μm and at about 1.56 μm. So a signal at 1.53 μm will be amplified more than one at 1.54 μm, which would be disadvantageous in a WDM system.

FIG. 9 illustrates an optical transmission system 70 using a temperature insensitive long-period shaping device 72 to shape the spectral gain characteristics of a rare-earth doped optical fiber amplifier. Specifically it is here used to reduce the spectral dependence of an erbium-doped fiber amplifier 54. The device 72 is disposed in the path of the amplifier 54. The shaping device 72 has one set of spacings $\Lambda$ chosen to remove energy of wavelength 1.53 μm corresponding to the gain peak wavelength of the amplifier and another set of spacings to remove energy of wavelength 1.56 μm at the other gain peak. By proper choice of the number of perturbations and the dosage of exposure, the gain spectrum of the amplifier/device combination can be made substantially flat over a range of wavelengths 1530 to 1560 nm. For a typical erbium amplifier, the shaping device exposed by a dosage ≦100 mJ/cm². 1000 pulses per slit will produce a more uniform gain response over the range of wavelengths 1530–1560 nm. The preferred packaging material is on FEP polymer, polyester or polyethylene.

Advantageously, system 70 can be a WDM system using a plurality of different wavelength signals, e.g. $\lambda s_1$ and $\lambda s_2$. It should be understood that the shaping device 72 need only be in the optical path of the amplifier. It can be before, after or within the optical amplifier cavity comprising the rare-earth-doped fiber.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

The invention claimed is:

1. A fiber long-period grating device having enhanced stability to variations in temperature comprising:

an optical fiber comprising a core and a cladding having a lower index of refraction for transmitting light of wavelength $\lambda$ in a guided mode, said fiber having a plurality of perturbations in its refractive index, said perturbations spaced apart by distances at least 10λ to form a long-period grating with a center wavelength $\lambda_p$, said center wavelength exhibiting a variation with temperature $d\lambda_p/dT$ and a variation with stress $d\lambda_p/d\epsilon$ which are opposite in sign; and said grating mechanically coupled to a body of material having a thermal expansion coefficient such that said grating will be stretched as the temperature increases to thereby reduce the variation of $\lambda_p$ with temperature.

2. A device according to claim 1 wherein said material has a thermal expansion coefficient such that the stretching of said grating substantially offsets the change in $\lambda_p$ with temperature.

3. A device according to claim 1 wherein said perturbations are spaced apart by distances in the range 15–1500 micrometers.

4. A device according to claim 1 wherein said fiber core comprises germanium-doped silica and said cladding comprises silica.

5. An optical fiber communications system comprising:

a source of an optical signal;

optically coupled to said source, an optical signal path comprising length of optical fiber for transmitting said optical signal;

disposed in said optical signal path, an optical amplifier for amplifying said optical signal;

a pair of pumping sources for pumping said optical amplifier with optical pumping energy of wavelengths $\lambda_{p1}$ and $\lambda_{p2}$;

disposed in the path of the energy from each pumping source after said pumping energy has passed through said amplifier unused, a spectral shaping a device for removing said unused pumping energy from said optical path comprising a long-period grating device according to claim 1.

6. A communications system according to claim 5 wherein said optical amplifier comprises an erbium-doped optical fiber amplifier.

7. An optical fiber communications system comprising:

a source of at least one optical signal;

optically coupled to said source, an optical signal path comprising a length of optical fiber for transmitting said optical signal;

disposed in said optical signal path, an optical amplifier having a gain spectral dependence with one or more peak regions providing different gain for different wavelengths;

disposed in said optical signal path, a spectral shaping device comprising a long-period grating device according to claim 1 for removing energy from the spectral region of one or more of said peak regions in order to provide a more uniform spectral output.

8. A communications system according to claim 7 wherein said optical amplifier comprises an erbium-doped optical fiber amplifier.

9. An optical fiber amplifier comprising a rare-earth doped length of optical fiber; and a long-period grating device according to claim 1 in the path of said fiber for shaping the spectral gain characteristics of said amplifier.

10. A fiber grating device capable of temperature stabilization by a single material package comprising:

an optical fiber comprising a core and a cladding having lower index of refraction than said core for transmitting light of wavelength $\lambda$ in a guided mode;

said fiber having a plurality of perturbations in its refractive index, said perturbations spaced apart by distances greater than 10λ to form a long period grating with a center wavelength $\lambda_p$;

and said center wavelength exhibiting a variation with temperature $d\lambda_p/dT$ and a variation with stress $d\lambda_p/d\epsilon$ which are opposite in sign.

11. A fiber grating device according to claim 10 wherein and said core comprises germanosilicate glass and said cladding comprises silica.

12. A device according to claim 1 wherein said body of material is a body of a single material.

13. A device according to claim 1 wherein said body of material is glass, polymer or metal.

* * * * *